United States Patent
Paluch (10) Patent No.: US 9,248,763 B2
(45) Date of Patent: Feb. 2, 2016

(54) ENERGY MANAGEMENT FEATURE FOR VEHICLE SEATING

(75) Inventor: Zbigniew Paluch, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 302 days.

(21) Appl. No.: 14/007,264

(22) PCT Filed: Mar. 28, 2012

(86) PCT No.: PCT/US2012/030950
§ 371 (c)(1),
(2), (4) Date: Nov. 19, 2013

(87) PCT Pub. No.: WO2012/135347
PCT Pub. Date: Oct. 4, 2012

(65) Prior Publication Data
US 2014/0070577 A1     Mar. 13, 2014

Related U.S. Application Data

(60) Provisional application No. 61/468,453, filed on Mar. 28, 2011.

(51) Int. Cl.
*B60N 2/42*    (2006.01)
*B60N 2/16*    (2006.01)
*B60N 2/427*   (2006.01)

(52) U.S. Cl.
CPC .............. *B60N 2/4228* (2013.01); *B60N 2/165* (2013.01); *B60N 2/1615* (2013.01); *B60N 2/42709* (2013.01)

(58) Field of Classification Search
CPC ............. B60N 2/4228; B60N 2/42709; B60N 2/1615; B60N 2/165

USPC ........................................................ 297/216.1
See application file for complete search history.

(56) References Cited

U.S. PATENT DOCUMENTS

| | | | |
|---|---|---|---|
| 6,460,819 B1 * | 10/2002 | Muhlberger | B60N 2/62 297/216.1 |
| 8,408,654 B2 * | 4/2013 | Jones | B60N 2/1803 297/216.1 |
| 9,045,061 B2 * | 6/2015 | Kostin | B60N 2/1615 297/344.12 |

FOREIGN PATENT DOCUMENTS

| DE | 19947873 C1 * | 8/2001 | B60N 2/22 |
| DE | 10 2006 005 966 A1 | 8/2007 | |

(Continued)

OTHER PUBLICATIONS

International Search Report for application No. PCT/US2012/030950 mailed Jun. 27, 2012.

(Continued)

*Primary Examiner* — Anthony D Barfield
(74) *Attorney, Agent, or Firm* — Fletcher Yoder, P.C.

(57) ABSTRACT

A vehicle seating system is provided that includes a first link having a first end rotatably coupled to a base, and a second link having a first end rotatably coupled to the base. The vehicle seating system also includes a main tube extending between a second end of the first link and a second end of the second link. The main tube is configured to transfer torque between the first and second links. The vehicle seating system further includes an energy management feature configured to facilitate rotation of the first link relative to the second link if a torque applied to the main tube exceeds a threshold value.

21 Claims, 7 Drawing Sheets

(56) References Cited

FOREIGN PATENT DOCUMENTS

| | | | | |
|---|---|---|---|---|
| GB | 2397358 A | * | 7/2004 | ............... B60N 2/06 |
| JP | H11278128 | | 10/1999 | |
| JP | 2006-027554 | | 2/2006 | |
| JP | 2009190430 | | 8/2009 | |

OTHER PUBLICATIONS

International Preliminary Report on Patentability for PCT No. PCT/US2012/030950 dated Oct. 10, 2013; 5 pgs.
Japanese Office Action mailed Oct. 28, 2014.
Chinese Office Action mailed Apr. 3, 2015.

* cited by examiner

ENERGY MANAGEMENT FEATURE FOR VEHICLE SEATING

CROSS REFERENCE TO RELATED APPLICATIONS

This application claims priority from and the benefit of PCT Application No. PCT/US2012/030950, filed on Mar. 28, 2012; and U.S. Provisional Patent Application No. 61/468,453, filed on Mar. 28, 2011; both entitled "Energy Management Feature for Vehicle Seating", which are herein incorporated by reference.

BACKGROUND

The invention relates generally to an energy management feature for vehicle seating.

Vehicle seating typically includes a seat bottom and a seat back to support a driver or passenger. In certain seating configurations, both the seat bottom and seat back include a rigid chassis, cushions, and a fabric covering. The cushions are coupled to the rigid chassis, and the fabric covering is disposed about the assembly. The rigid chassis of the seat bottom serves to support the weight (i.e., vertical load) of the passenger, and couples the seat to a floor of the vehicle.

Certain vehicle seats include a position adjustment mechanism configured to vary a height and/or orientation of the seat bottom chassis relative to the floor of the vehicle. For example, the position adjustment mechanism may include multiple links extending between a base and a main tube of the seat bottom chassis. In certain configurations, one link may include a sector gear configured to interface with a drive gear to facilitate rotation of the link relative to the base. As the link rotates, the main tube is driven vertically upward or downward relative to the vehicle floor, thereby varying the height and/or orientation of the seat bottom chassis.

During a rear impact, a driver or passenger within the vehicle seat will apply a rearward force to the seat back and/or a downward force to a rear portion of the seat bottom. The rearward force applied to the seat back will be transferred through a recliner mechanism to the seat bottom chassis, thereby driving the seat bottom chassis rearwardly and downwardly relative to the floor of the vehicle. As a result, the links will be urged to rotate. However, contact between the teeth of the sector gear and the teeth of the drive gear will block rotation of the links, thereby inducing a torque within the main tube. Consequently, an excessive impact force may induce an undesirable contact force between the teeth of the sector gear and the teeth of the drive gear, an undesirable torque through the recliner mechanism and/or an undesirable bending moment through lateral supports of the seat bottom chassis.

BRIEF DESCRIPTION OF THE INVENTION

The present invention relates to a vehicle seating system including a first link having a first end rotatably coupled to a base, and a second link having a first end rotatably coupled to the base. The vehicle seating system also includes a main tube extending between a second end of the first link and a second end of the second link. The main tube is configured to transfer torque between the first and second links. The vehicle seating system further includes an energy management feature configured to facilitate rotation of the first link relative to the second link if a torque applied to the main tube exceeds a threshold value.

The present invention also relates to a vehicle seating system including a first link having a first end rotatably coupled to a base, and a second link having a first end rotatably coupled to the base. The vehicle seating system also includes a main tube non-rotatably coupled to a second end of the first link. The vehicle seating system further includes an energy management feature having a secondary tube non-rotatably coupled to a second end of the second link, and non-rotatably coupled to the main tube. The secondary tube is configured to facilitate rotation of the main tube relative to the second link if a torque applied to the secondary tube exceeds a threshold value.

The present invention further relates to a vehicle seating system including a first link having a first end rotatably coupled to a base, and a second link having a first end rotatably coupled to the base. The vehicle seating system also includes a main tube non-rotatably coupled to a second end of the first link, and non-rotatably coupled to a second end of the second link. The main tube includes an energy management feature configured to facilitate rotation of the first link relative to the second link if a torque applied to the main tube exceeds a threshold value.

DETAILED DESCRIPTION

Figure 1:
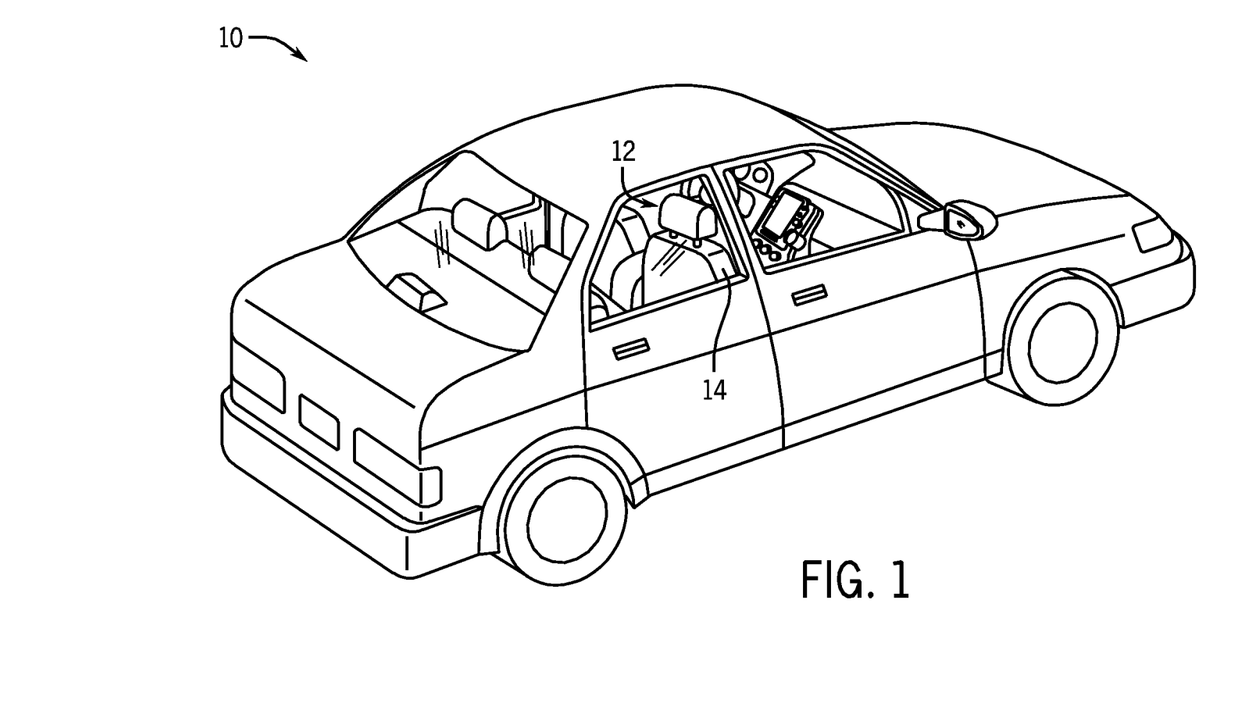
FIG. 1 is a perspective view of an exemplary vehicle that may include a seat having an energy management feature.

FIG. 1 is a perspective view of an exemplary vehicle 10 that may include a seat having an energy management feature. As illustrated, the vehicle 10 includes an interior 12 having a seat 14. As discussed in detail below, the seat 14 includes an energy management feature configured to absorb a portion of the energy from a rear impact, thereby substantially reducing the load applied to certain components throughout the vehicle seat 14. For example, in certain embodiments, the vehicle seat 14 includes a first link having a first end rotatably coupled to a base, and a second link having a first end rotatably coupled to the base. The vehicle seat 14 also includes a main tube extending between a second end of the first link and a second end of the second link. The main tube is configured to transfer torque between the first and second links. The vehicle seat 14 further includes an energy management feature configured to facilitate rotation of the first link relative to the second link if a torque applied to the main tube exceeds a threshold value.

As a result of this configuration, the energy management feature will absorb energy associated with a rear impact, thereby substantially reducing a contact force between teeth of a position adjustment mechanism, a torque through a recliner mechanism and/or a bending moment through lateral supports of a seat bottom chassis.

Figure 2:
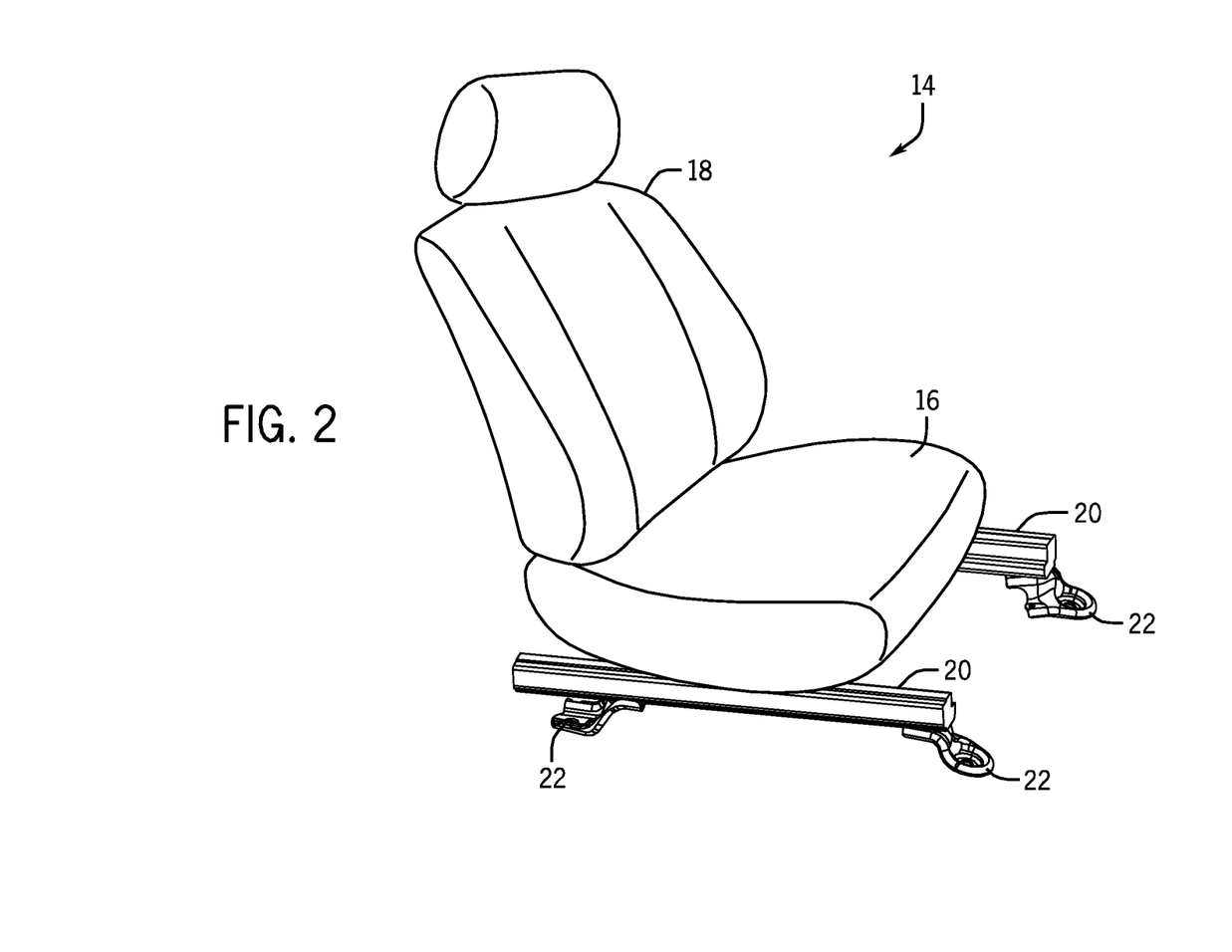
FIG. 2 is a perspective view of the seat shown in FIG. 1.

FIG. 2 is a perspective view of the seat 14 shown in FIG. 1. As illustrated, the seat 14 includes a seat bottom 16 and a seat back 18. In the present embodiment, the seat bottom 16 includes a seat bottom chassis, one or more cushions, and a fabric covering. The seat bottom chassis serves to support the weight of a passenger during normal vehicle operation and during high g-force events (e.g., rapid acceleration or deceleration, etc.). The seat bottom chassis also secures the seat bottom 16 to a floor of the vehicle 10, and provides a mounting surface for the seat back 18. One or more cushions may be coupled to the seat bottom chassis to provide passenger comfort, and the fabric covering may be disposed about the assembly to provide a desired appearance and/or to protect the internal components of the seat bottom 16. The seat back 18 may be constructed in a similar manner, i.e., from one or more cushions secured to a rigid chassis and wrapped with a fabric covering. As discussed in detail below, the seat may include an energy management feature configured to absorb a portion of the energy from a rear impact, thereby substantially reducing the load on various components throughout the vehicle seat 14.

As illustrated, the seat bottom 16 is secured to a seat track 20. The seat track 20, in turn, is secured to the floor of the vehicle 10 by mounting feet 22. In certain configurations, the seat 14 may be configured to translate along the seat track 20 to adjust a longitudinal position of a driver or passenger. As will be appreciated, adjustment of the seating position may be either manual or assisted. For example, an electric motor may be configured to drive the seat 14 along the track 20 by a suitable mechanism such as a rack and pinion system. In addition, the seat back 18 may be configured to recline with respect to the seat bottom 16. Adjustment of the seat back 18 may also be either manual or assisted by an electric motor, for example.

Figure 3:
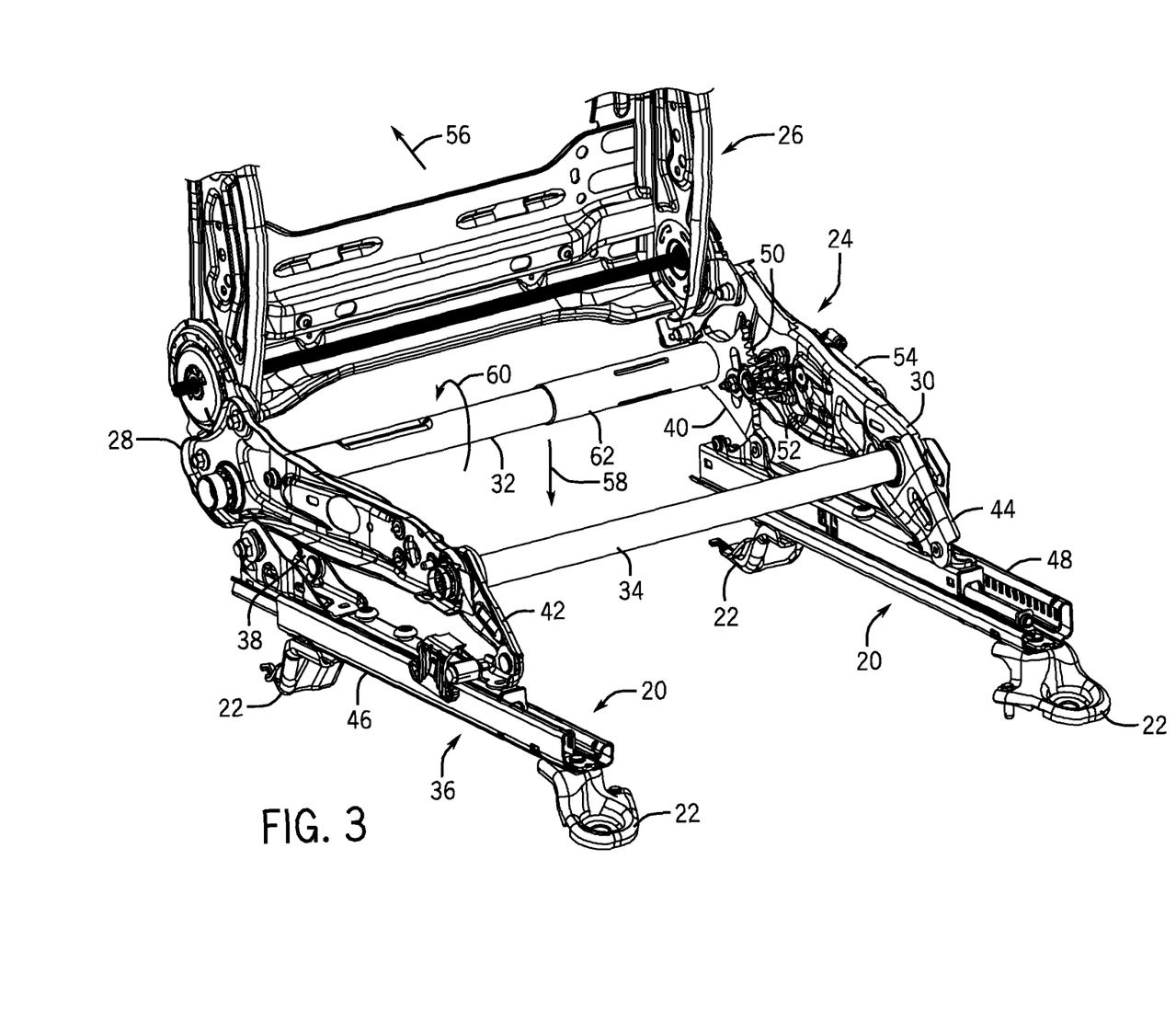
FIG. 3 is a perspective view of a seat bottom chassis including an embodiment of an energy management feature configured to absorb energy from a rear impact.

FIG. 3 is a perspective view of a seat bottom chassis 24 including an embodiment of an energy management feature configured to absorb energy from a rear impact. As illustrated, the seat bottom chassis 24 is rotatably coupled to a seat back chassis 26 configured to support the seat back. The seat bottom chassis 24 includes a first lateral support 28, a second lateral support 30, a first main tube 32 and a second main tube 34. The lateral supports and main tubes form a structure configured to support the weight of a passenger during normal vehicle operation and during high g-force events (e.g., rapid acceleration or deceleration, etc.).

In the illustrated embodiment, the seat bottom chassis 24 is coupled to a base 36 by a first link 38, a second link 40, a third link 42 and a fourth link 44. The links 38, 40, 42 and 44 enable movement of the seat bottom chassis 24 relative to the base 36. For example, a height and/or orientation of the seat bottom chassis 24 may be adjusted via rotation of the links. As illustrated, the first link 38 is rotatably coupled to a first seat track 46 of the base 36, and the second link 40 is rotatably coupled to a second seat track 48. The second link 40 includes an integrated sector gear 50 configured to interface with a drive gear 52 to facilitate rotation of the second link 40 relative to the base 36. In the illustrated embodiment, the drive gear 52 is driven to rotate by an electric motor 54. However, it should be appreciated that alternative embodiments may employ other suitable devices, such as hydraulic or pneumatic actuators, to induce the drive gear 52 to rotate.

In the illustrated embodiment, rotation of the drive gear 52 will raise or lower the seat bottom chassis 24 relative to a vehicle floor. Specifically, rotation of the drive gear 52 will induce the second link 40 to rotate relative to the second seat track 48, thereby adjusting the height of the second lateral support 30. In addition, rotation of the second link 40 will drive the main tube 32 to rotate, thereby inducing the first link 38 to rotate relative to the first seat track 46. As a result, the first lateral support 28 will be driven in the same direction as the second lateral support 30. In this manner, a driver or passenger may adjust the height of the seat bottom chassis 24 via input to the electric motor 54.

During a rear impact, a driver or passenger within the vehicle seat will apply a force to the seat back chassis 26 in a rearward direction 56. The rearward force applied to the seat back chassis 26 will be transferred through a recliner mechanism to the seat bottom chassis 24, thereby driving the seat bottom chassis rearwardly and downwardly relative to the floor of the vehicle. In addition, the driver or passenger will apply a force to a rear portion of the seat bottom chassis 24 in a downward direction 58 and/or in the rearward direction 56, thereby further urging the seat bottom chassis 24 rearwardly and downwardly. As a result, the first link 38, the second link 40 and the main tube 32 will be urged to rotate in the direction 60. However, contact between the teeth of the sector gear 50 and the teeth of the drive gear 52 will block rotation of the links, thereby induces a torque within the main tube 32. Consequently, an excessive impact force may induce an undesirable contact force between the teeth of the sector gear 50 and the teeth of the drive gear 52, an undesirable torque through the recliner mechanism and/or an undesirable bending moment through lateral supports 28 and 30.

To substantially reduce the forces and moments on the seating components, the vehicle seat includes an energy management feature configured to absorb energy from a rear impact. In the illustrated embodiment, the energy management feature includes a secondary tube 62 non-rotatably coupled to the second link 40, and non-rotatably coupled to the main tube 32. As discussed in detail below, the secondary tube 62 is configured to facilitate rotation of the main tube 32 relative to the second link 40 if a torque applied to the secondary tube 62 exceeds a threshold value. For example, during a rear impact in which the torque applied to the secondary tube 62 exceeds the threshold value, the secondary tube will twist, thereby absorbing a portion of the energy from the impact. As a result, the first link 38 will rotate relative to the second link 40, and the load applied to the teeth of the sector gear 50, the torque applied to the recliner mechanism and/or the bending moment applied to the lateral supports 28 and 30 will be substantially reduced.

Figure 4:
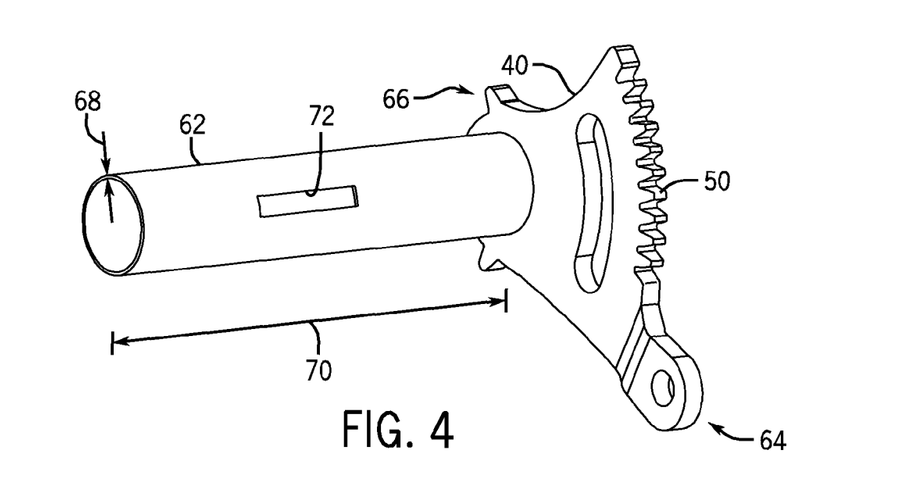
FIG. 4 is a perspective view of an embodiment of an energy management feature including a secondary tube coupled to a link having an integrated sector gear.

FIG. 4 is a perspective view of an embodiment of an energy management feature including a secondary tube 62 coupled to a link 40 having an integrated sector gear 50. In the illustrated embodiment, the second link 40 includes a first end 64 configured to rotatably couple to the base 36, and a second end 66 non-rotatably coupled to the secondary tube 62. In addition, the secondary tube 62 is non-rotatably coupled to the main tube 32 (e.g., at an end opposite from the second link 40). As a result of this configuration, a height of the rear portion 56 of the seat bottom chassis 24 may be adjusted by rotating the second link 40, thereby transferring torque through the main tube 32 and the secondary tube 62 to the first link 38. As the links rotate, the rear portion 56 of the seat bottom chassis 24 will be driven upwardly or downwardly. However, during a rear impact, the secondary tube 62 will twist if the torque applied to the secondary tube 62 exceeds a threshold value. Consequently, the secondary tube 62 will absorb a portion of the energy from the impact, thereby substantially reducing a load applied to various components throughout the seat bottom chassis 24 (e.g., sector gear teeth, lateral supports, recliner mechanism, etc.).

By way of example, rotation of the drive gear 52 will induce the second link 40 to rotate relative to the second seat track 48. Due to the non-rotatable connection with the secondary tube 62, rotation of the second link 40 will induce the secondary tube 62 to rotate. Furthermore, rotation of the secondary tube 62 will drive the main tube 32 to rotate via the non-rotatable coupling between the tubes, and the main tube 32 will drive the first link 38 to rotate via the non-rotatable coupling between the main tube 32 and the first link 38. As previously discussed, rotation of the links 38 and 40 will raise or lower the seat bottom chassis 24 relative to the floor of the vehicle. However, in certain embodiments, rotation of the links 38 and 40 may vary a height of a rear portion of the chassis 24 relative to a front portion, thereby inducing the seat bottom to tilt. During the height adjustment process, torque will be transferred from the second link 40 to the first link 38 via the secondary tube 62 and the main tube 32. Because the torque applied by the electric motor 54 is less than the threshold value, the tubes 32 and 62 will remain substantially rigid as the rear portion 56 of the seat bottom chassis 24 is raised and lowered. Consequently, the first link 38 and the second link 40 will rotate through substantially equal angles. However, during a rear impact in which the torque applied to the secondary tube 62 exceeds the threshold value, the secondary tube will twist, thereby absorbing a portion of the energy from the impact. As a result, the first link 38 will rotate relative to the second link 40, and the load applied to the teeth of the sector gear 50, the torque applied to the recliner mechanism and/or the bending moment applied to the lateral supports 28 and 30 will be substantially reduced.

The threshold torque sufficient to induce the secondary tube 62 to twist may be particularly selected to enable the secondary tube to remain substantially rigid during the height adjustment process, and to absorb energy during a rear impact. For example, a wall thickness 68 of the secondary tube 62 may be adjusted to achieve the desired threshold torque. As will be appreciated, a thicker wall thickness 68 will increase the threshold torque, and a thinner wall thickness will reduce the threshold torque. In addition, a material of the secondary tube 62 may be particularly selected to achieve the desired threshold torque. For example, the secondary tube may be formed from a substantially resilient material, such as spring steel. Furthermore, the threshold torque may be selected based on a length 70 of the secondary tube. A longer length 70 will provide a lower threshold torque, and a shorter length will provide a higher threshold torque. In the illustrated embodiment, the secondary tube 62 includes a slot 72 configured to decrease the rotational stiffness of the secondary tube 62. While only a single slot 72 is included in the illustrated embodiment, it should be appreciated that more or fewer slots may be utilized in alternative embodiments. Specifically, the threshold torque will decrease as the number of slots increases. Furthermore, the configuration (e.g., width, shape, length, etc.) of each slot 72 may be particularly selected to achieve the desired threshold torque.

Figure 5:
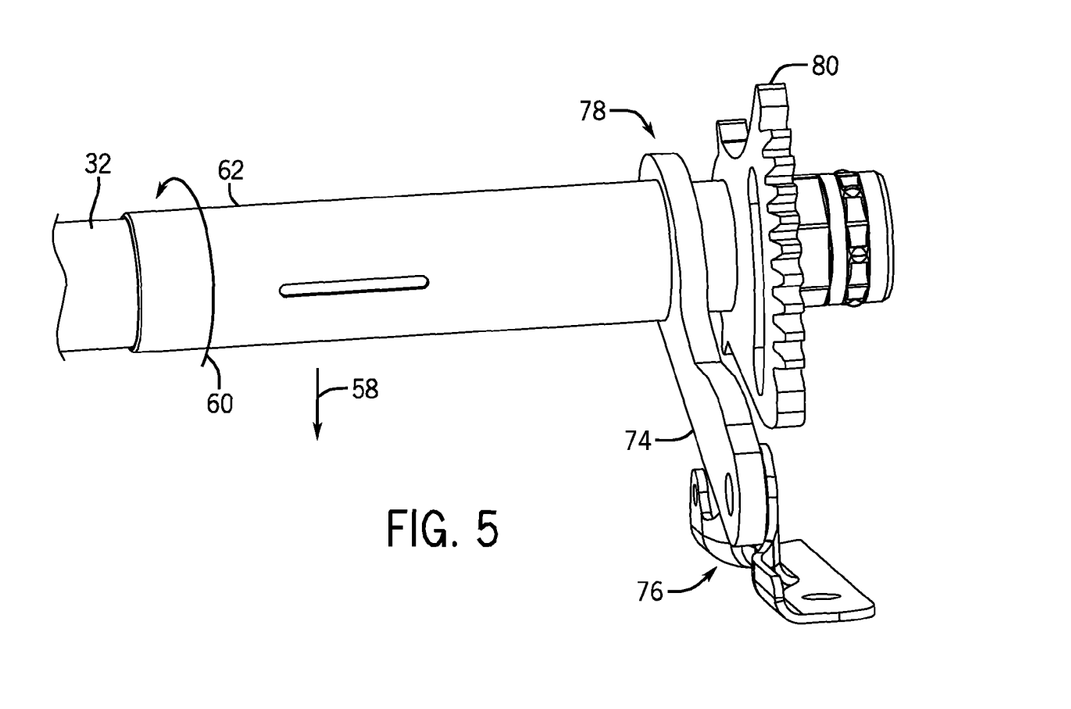
FIG. 5 is a perspective view of an alternative embodiment of an energy management feature including a secondary tube coupled to a link, and a sector gear coupled to a main tube.

FIG. 5 is a perspective view of an alternative embodiment of an energy management feature including a secondary tube coupled to a link, and a sector gear coupled to a main tube. As illustrated, an alternative link 74 is employed to couple the secondary tube 62 to the base 36. Similar to the second link 40 described above with reference to FIG. 4, the link 74 includes a first end 76 configured to rotatably couple to the base 36, and a second end 78 non-rotatably coupled to the secondary tube 62. However, the link 74 does not include an integrated sector gear. Instead, an independent sector gear 80 is utilized to facilitate height adjustment of the seat bottom chassis 24. In the illustrated embodiment, the sector gear 80 is non-rotatably coupled to the main tube 32. Consequently, as the sector gear 80 is driven to rotate by the drive gear, the main tube 32 and the first link 38 will rotate. In addition, due to a non-rotatable coupling between the main tube 32 and the secondary tube 62 (e.g., at an end opposite from the link 74), rotation of the main tube 32 will drive the secondary tube 62 to rotate, thereby rotating the link 74 relative to the base 36.

As previously discussed, a rear impact will urge the main tube 32 and the secondary tube 62 to rotate in the direction 60, thereby inducing a torque within the tubes. If the torque applied to the secondary tube 62 exceeds a threshold value, the secondary tube 62 will twist and absorb a portion of the rotational energy applied to the tubes. As a result, the link 74 will rotate relative to the sector gear 80, thereby enabling the lateral support 30 to move in the downward direction 58 during a rear impact. Consequently, the load applied to the teeth of the sector gear 80, the torque applied to the recliner mechanism and/or the bending moment applied to the lateral supports 28 and 30 will be substantially reduced. In addition, torque applied by the link 74 may induce the tube 32 and a portion of the secondary tube 62 to twist slightly, thereby allowing the teeth of the sector gear to move into a stable position relative to the teeth of the drive gear. Consequently, the load on the sector gear teeth may be further reduced.

Figure 6:
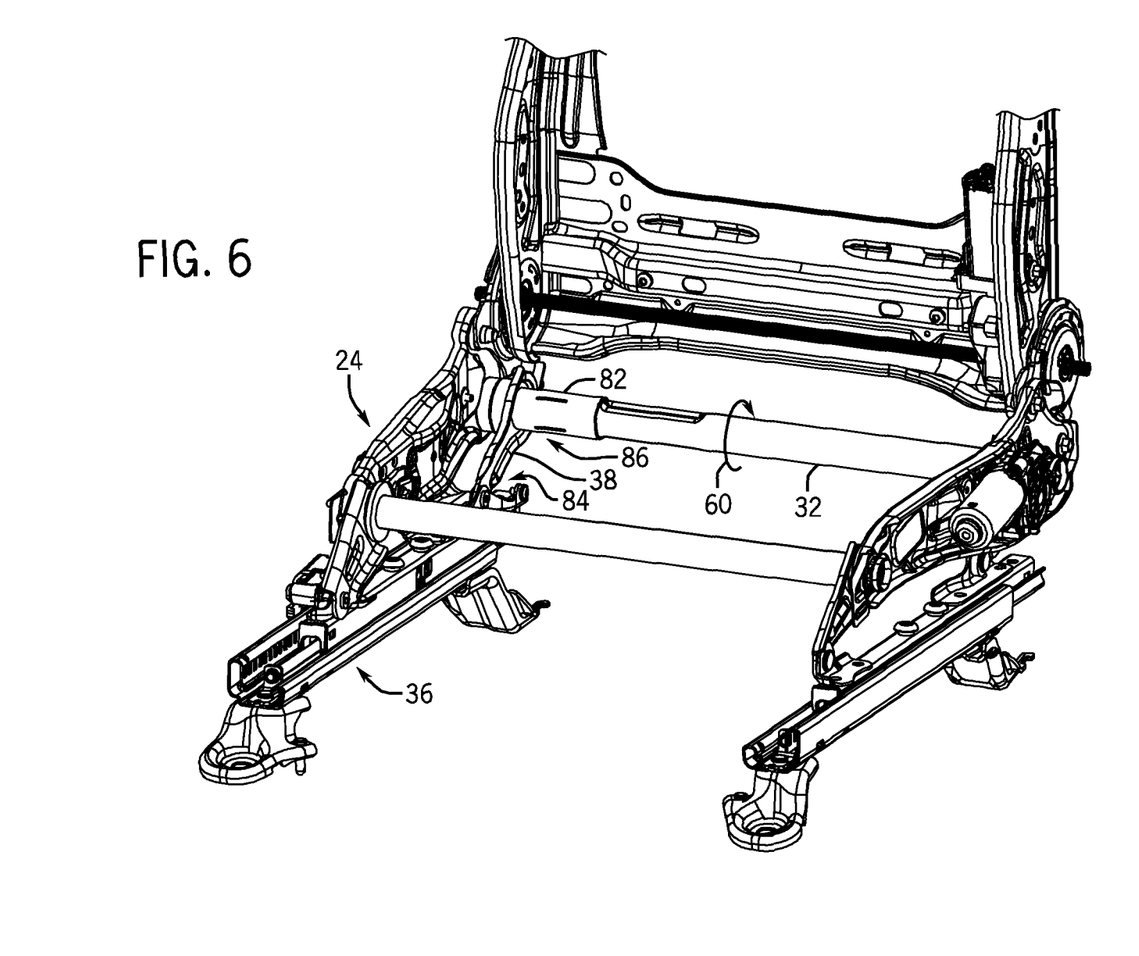
FIG. 6 is a perspective view of a seat bottom chassis including a further embodiment of an energy management feature.

FIG. 6 is a perspective view of a seat bottom chassis 24 including a further embodiment of an energy management feature. In the illustrated embodiment, a secondary tube 82 is non-rotatably coupled to the first link 38, and non-rotatably coupled to the main tube 32 (e.g., at an end opposite from the first link 38). Specifically, the first link 38 includes a first end 84 rotatably coupled to the base 36, and a second end 86 non-rotatably coupled to the secondary tube 82. In this configuration, as the sector gear (e.g., an independent sector gear, or a sector gear integrated with the second link) is driven to rotate by the drive gear, the main tube 32 and the second link will rotate. In addition, due to the non-rotatable coupling between the main tube 32 and the secondary tube 82, rotation of the main tube 32 will drive the secondary tube 82 to rotate, thereby rotating the first link 38 relative to the base 36. As a result, the seat bottom chassis 24 may be adjusted to a user-selectable height. Furthermore, a rear impact will urge the main tube 32 and the secondary tube 82 to rotate in the direction 60, thereby inducing a torque within the tubes. If the torque applied to the secondary tube 82 exceeds a threshold value, the secondary tube 82 will twist and absorb a portion of the rotational energy applied to the tubes. Consequently, the first link 38 will rotate relative to the second link and the sector gear, thereby reducing the load applied to the teeth of the sector gear, the torque applied to the recliner mechanism and/or the bending moment applied to the lateral supports. While the energy management feature of the illustrated embodiment includes a single secondary tube 82 coupled to the first link 38, it should be appreciated that alternative embodiments may include a first secondary tube coupled to the first link and a second secondary tube coupled to the second link (e.g., as illustrated in FIG. 3). The combination of the two secondary tubes may absorb additional energy from the rear impact, thereby further reducing the load on components of the seat bottom chassis 24.

Figure 7:
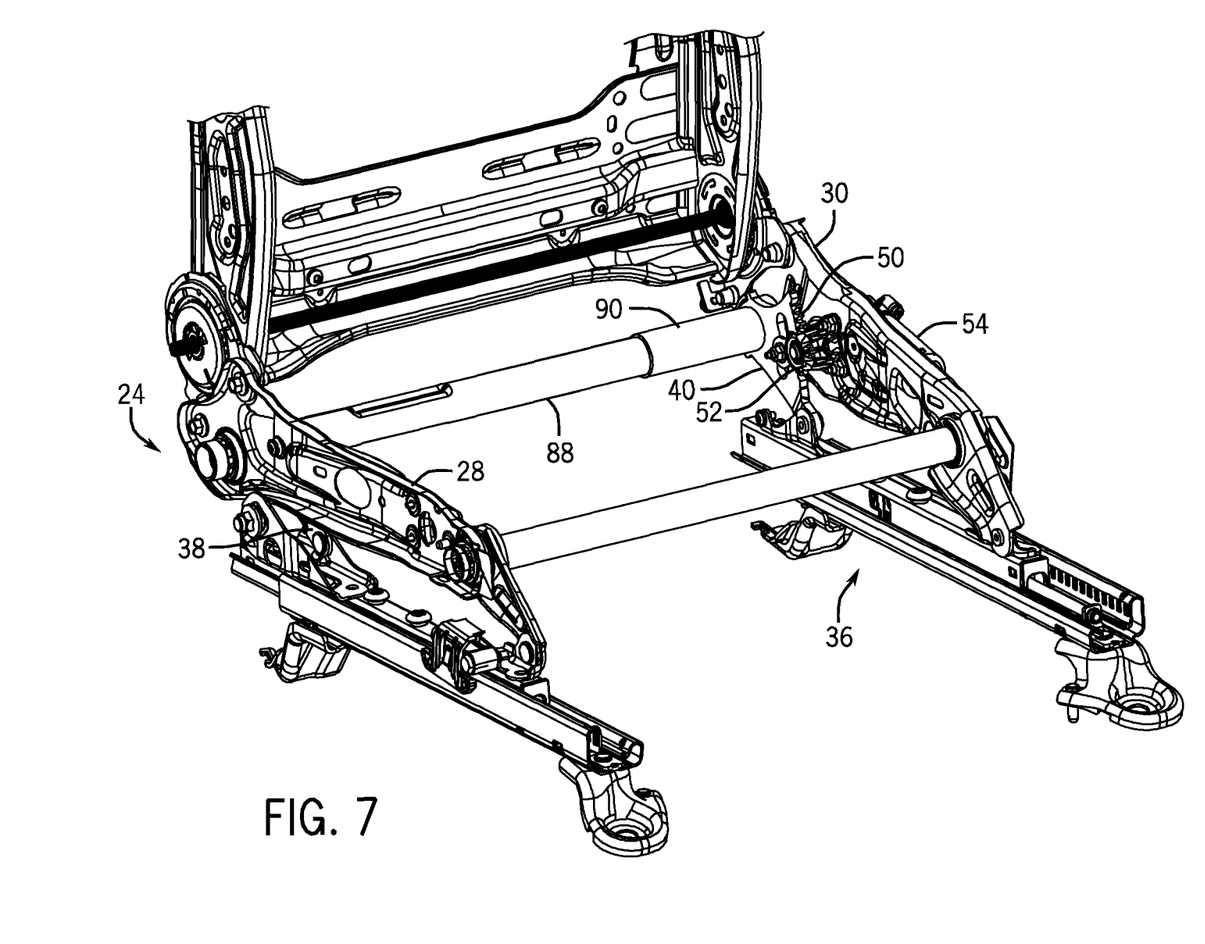
FIG. 7 is a perspective view of a seat bottom chassis including a main tube having an integrated energy management feature.

FIG. 7 is a perspective view of a seat bottom chassis including a main tube 88 having an integrated energy management feature. In the illustrated embodiment, the main tube 88 is non-rotatably coupled to the first link 38, and non-rotatably coupled to the second link 40. As discussed in detail below, the main tube 88 includes an energy management feature configured to facilitate rotation of the first link 38 relative to the second link 40 if a torque applied to the main tube 88 exceeds a threshold value. In the illustrated embodiment, rotation of the drive gear 52 will induce the second link 40 to rotate relative to the base 36. Due to the non-rotatable connection between the second link 40 and the main tube 88, rotation of the second link 40 will induce the main tube 88 to rotate. In addition, the main tube 88 will drive the first link 38 to rotate via the non-rotatable coupling between the main tube 88 and the first link 38. As previously discussed, rotation of the links 38 and 40 will raise or lower the seat bottom chassis 24 relative to the floor of the vehicle.

During the height adjustment process, torque will be transferred from the second link 40 to the first link 38 via the main tube 88. Because the torque applied by the electric motor 54 is less than the threshold value, the main tube 88 will remain substantially rigid as the rear portion 56 of the seat bottom chassis 24 is raised and lowered. Consequently, the first link 38 and the second link 40 will rotate through substantially equal angles. However, during a rear impact in which the torque applied to the main tube 88 exceeds the threshold value, the main tube will twist, thereby absorbing a portion of the energy from the impact. As a result, the first link 38 will rotate relative to the second link 40, thereby reducing the load applied to the teeth of the sector gear, the torque applied to the recliner mechanism and/or the bending moment applied to the lateral supports.

In the illustrated embodiment, a secondary tube 90 is disposed about a portion of the main tube 88. The secondary tube 90 is configured to reduce deformation of the main tube 88 when a bending load is applied to the main tube. For example, during a side impact, the lateral supports 28 and 30 will be urged toward one another, thereby inducing a bending moment and/or a compressive load through the main tube 88. By providing a secondary tube 90 about the main tube 88, deformation of the main tube 88 will be substantially reduced. While the illustrated embodiment includes a secondary tube 90 positioned adjacent to the second link 40, it should be appreciated that alternative embodiments may include a secondary tube positioned adjacent to the first link 38 and/or at various positions along the length of the main tube 88.

Figure 8:
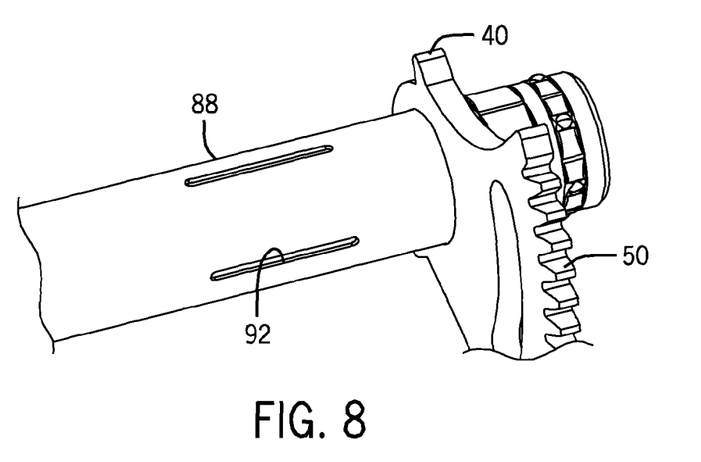
FIG. 8 is a perspective view of a portion of the main tube shown in FIG. 7.

FIG. 8 is a perspective view of a portion of the main tube shown in FIG. 7. The threshold torque sufficient to induce the main tube 88 to twist may be particularly selected to enable the main tube to remain substantially rigid during the height adjustment process, and to absorb energy during a rear impact. For example, a wall thickness of the main tube 88 may be adjusted to achieve the desired threshold torque. As will be appreciated, a thicker wall thickness will increase the threshold torque, and a thinner wall thickness will reduce the threshold torque. In addition, a material of the main tube 88 may be particularly selected to achieve the desired threshold torque. For example, the main tube 88 may be formed from a substantially resilient material, such as spring steel. In the illustrated embodiment, the main tube 88 includes multiple slots 92. As will be appreciated, the threshold torque may be particularly selected based on the number of slots 92 within the main tube 88. Specifically, the threshold torque will decrease as the number of slots increases. Furthermore, the configuration (e.g., width, shape, length, etc.) of each slot 92 may be particularly selected to achieve the desired threshold torque.

Further embodiments may include a main tube having an integrated energy absorbing feature, and a secondary tube non-rotatably coupled to the main tube and configured to absorb additional energy. For example, a main tube having an integrated energy absorbing feature may be utilized within the embodiment described above with reference to FIG. 5. In such a configuration, a rear impact will urge the main tube and the secondary tube to rotate, thereby inducing a torque within the tubes. If the torque applied to the secondary tube exceeds a first threshold value, the secondary tube will twist and absorb a portion of the rotational energy applied to the tubes. Furthermore, if the torque applied to the main tube exceeds a second threshold value, the main tube will twist and absorb additional rotational energy. As a result, the link will rotate relative to the sector gear, thereby enabling the lateral support to move in a downward direction during a rear impact. Consequently, the load applied to the teeth of the sector gear, the torque applied to the recliner mechanism and/or the bending moment applied to the lateral supports and will be substantially reduced.

Figure 9:
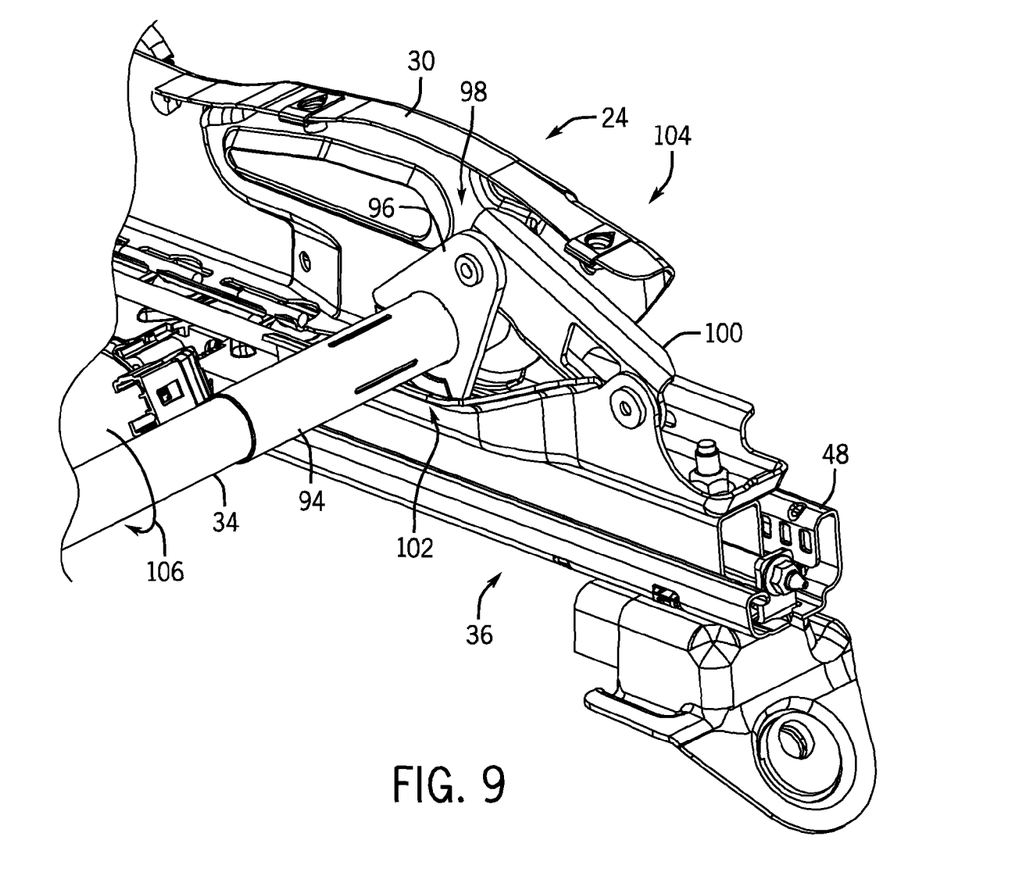
FIG. 9 is a perspective view of an energy management feature mounted to a second main tube of the seat bottom chassis.

FIG. 9 is a perspective view of an energy management feature mounted to the second main tube 34 of the seat bottom chassis 24. In the illustrated embodiment, a secondary tube 94 is non-rotatably coupled to a link 96, and non-rotatably coupled to the main tube 34. Specifically, the link 96 includes a first end 98 rotatably coupled to the base 36 by a linkage 100, and a second end 102 non-rotatably coupled to the secondary tube 94. In this configuration, as a sector gear (e.g., an independent sector gear, or a sector gear integrated with a link) is driven to rotate by a drive gear, the main tube 34 will rotate. In addition, due to the non-rotatable coupling between the main tube 34 and the secondary tube 94, rotation of the main tube 34 will drive the secondary tube 94 to rotate, thereby rotating the link 96 relative to the base 36. As a result, a front portion 104 of the seat bottom chassis 24 may be adjusted to a user-selectable height. Furthermore, a rear impact will urge the main tube 34 and the secondary tube 94 to rotate in the direction 106, thereby inducing a torque within the tubes. If the torque applied to the secondary tube 94 exceeds a threshold value, the secondary tube 94 will twist and absorb a portion of the rotational energy applied to the tubes. As a result, the link 96 will rotate relative to the opposite link, thereby reducing the load applied to the teeth of the sector gear, the torque applied to the recliner mechanism and/or the bending moment applied to the lateral supports. While the energy absorbing feature of the illustrated embodiment includes a single secondary tube 94 coupled to the link 96, it should be appreciated that alternative embodiments may include a first secondary tube coupled to a first link and a second secondary tube coupled to a second link. The combination of the two secondary tubes may absorb additional energy from the rear impact, thereby further reducing the load on certain seat bottom chassis components. Furthermore, it should be appreciated that alternative links may be directly coupled to the base 36, such as the fourth link 44 of the embodiment described above with reference to FIG. 3.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle seating system, comprising:
a first link having a first end rotatably coupled to a base;
a second link having a first end rotatably coupled to the base;
a main tube extending between a second end of the first link and a second end of the second link, wherein the main tube is configured to transfer torque between the first and second links; and
an energy management feature configured to facilitate rotation of the first link relative to the second link if a torque applied to the main tube exceeds a threshold value.

2. The vehicle seating system of claim 1, wherein the main tube is non-rotatably coupled to the second end of the first link, the energy management feature comprises a secondary tube non-rotatably coupled to the second end of the second link, and non-rotatably coupled to the main tube, and the secondary tube is configured to facilitate rotation of the main tube relative to the second link if the torque exceeds the threshold value.

3. The vehicle seating system of claim 2, wherein the threshold value is based on a wall thickness of the secondary tube, a material of the secondary tube, a length of the secondary tube, a number of slots within the secondary tube, a configuration of at least one slot within the secondary tube, or a combination thereof.

4. The vehicle seating system of claim 2, wherein the first link comprises a sector gear configured to interface with a drive gear to facilitate rotation of the first link relative to the base.

5. The vehicle seating system of claim 2, wherein the second link comprises a sector gear configured to interface with a drive gear to facilitate rotation of the second link relative to the base.

6. The vehicle seating system of claim 1, wherein the main tube is non-rotatably coupled to the second end of the first link, and non-rotatably coupled to the second end of the second link, and the energy management feature is integrated within the main tube.

7. The vehicle seating system of claim 6, wherein the energy management feature comprises at least one slot within the main tube.

8. The vehicle seating system of claim 6, comprising a secondary tube disposed about the main tube, wherein the secondary tube is configured to reduce deformation of the main tube when a bending moment, a compressive load, or a combination thereof, is applied to the main tube.

9. The vehicle seating system of claim 1, wherein the main tube is an element of a seat bottom chassis, and rotation of the first and second links relative to the base varies a height of the seat bottom chassis relative to the base, an orientation of the seat bottom chassis relative to the base, or a combination thereof.

10. The vehicle seating system of claim 1, wherein the base comprises a first seat track configured to support the first link, and a second seat track configured to support the second link.

11. A vehicle seating system, comprising:
a first link having a first end rotatably coupled to a base;
a second link having a first end rotatably coupled to the base;
a main tube non-rotatably coupled to a second end of the first link; and
an energy management feature having a secondary tube non-rotatably coupled to a second end of the second link, and non-rotatably coupled to the main tube, wherein the secondary tube is configured to facilitate rotation of the main tube relative to the second link if a torque applied to the secondary tube exceeds a threshold value.

12. The vehicle seating system of claim 11, wherein the first link comprises a sector gear configured to interface with a drive gear to facilitate rotation of the first link relative to the base.

13. The vehicle seating system of claim 11, wherein the second link comprises a sector gear configured to interface with a drive gear to facilitate rotation of the second link relative to the base.

14. The vehicle seating system of claim 11, comprising a sector gear non-rotatably coupled to the main tube, wherein the sector gear is configured to interface with a drive gear to facilitate rotation of the main tube relative to the base.

15. The vehicle seating system of claim 11, wherein the threshold value is based on a wall thickness of the secondary tube, a material of the secondary tube, a length of the secondary tube, a number of slots within the secondary tube, a configuration of at least one slot within the secondary tube, or a combination thereof.

16. A vehicle seating system, comprising:
a first link having a first end rotatably coupled to a base;
a second link having a first end rotatably coupled to the base;
a main tube non-rotatably coupled to a second end of the first link, and non-rotatably coupled to a second end of the second link, wherein the main tube comprises an energy management feature configured to facilitate rotation of the first link relative to the second link if a torque applied to the main tube exceeds a threshold value.

17. The vehicle seating system of claim 16, comprising a secondary tube disposed about the main tube, wherein the secondary tube is configured to reduce deformation of the main tube when a bending load is applied to the main tube.

18. The vehicle seating system of claim 16, wherein the energy management feature comprises at least one slot within the main tube.

19. The vehicle seating system of claim 16, wherein the first link comprises a sector gear configured to interface with a drive gear to facilitate rotation of the first link relative to the base.

20. The vehicle seating system of claim 16, wherein the main tube is an element of a seat bottom chassis, and rotation of the first and second links relative to the base varies a height of the seat bottom chassis relative to the base, an orientation of the seat bottom chassis relative to the base, or a combination thereof.

21. A vehicle seating system, comprising:
a first link having a first end rotatably coupled to a base;
a second link having a first end rotatably coupled to the base;
a main tube non-rotatably coupled to a second end of the first link;

a sector gear non-rotatably coupled to the main tube, wherein the sector gear is configured to interface with a drive gear to facilitate rotation of the main tube relative to the base; and an energy management feature having a secondary tube non-rotatably coupled to a second end of the second link, and non-rotatably coupled to the main tube, wherein the secondary tube is configured to facilitate rotation of the second link relative to the main tube and the sector gear if a torque applied to the secondary tube exceeds a threshold value.

* * * * *